United States Patent
Wu et al.

(10) Patent No.: US 11,675,601 B2
(45) Date of Patent: Jun. 13, 2023

(54) SYSTEMS AND METHODS TO CONTROL SOFTWARE VERSION WHEN DEPLOYING OS APPLICATION SOFTWARE FROM THE BOOT FIRMWARE

(71) Applicant: DELL PRODUCTS L.P., Round Rock, TX (US)

(72) Inventors: Dongli Wu, Allen, TX (US); James D. Testerman, McKinney, TX (US); Kristopher Slocum, Sachse, TX (US)

(73) Assignee: Dell Products L.P., Round Rock, TX (US)

( * ) Notice: Subject to any disclaimer, the term of this patent is extended or adjusted under 35 U.S.C. 154(b) by 74 days.

(21) Appl. No.: 17/328,583

(22) Filed: May 24, 2021

(65) Prior Publication Data

US 2022/0374244 A1 Nov. 24, 2022

(51) Int. Cl.
*G06F 9/44* (2018.01)
*G06F 9/4401* (2018.01)
*G06F 8/61* (2018.01)
*H04L 67/06* (2022.01)
*G06F 8/71* (2018.01)
*G06F 9/445* (2018.01)

(52) U.S. Cl.
CPC .............. *G06F 9/4406* (2013.01); *G06F 8/61* (2013.01); *G06F 8/71* (2013.01); *G06F 9/445* (2013.01); *H04L 67/06* (2013.01)

(58) Field of Classification Search
CPC . G06F 9/4406; G06F 8/61; G06F 8/71; G06F 9/445; H04L 67/06
USPC ........................................................ 717/175
See application file for complete search history.

(56) References Cited

U.S. PATENT DOCUMENTS

| | | | |
|---|---|---|---|
| 2020/0348946 A1 | 11/2020 | Pant et al. | |
| 2020/0349009 A1* | 11/2020 | Samuel | G06F 11/1469 |
| 2021/0240545 A1 | 8/2021 | Kumar et al. | |

\* cited by examiner

*Primary Examiner* — John Q Chavis (74) *Attorney, Agent, or Firm* — Egan, Enders & Huston LLP (57) ABSTRACT

Embodiments of systems and computer implemented methods are disclosed to automatically restore operating system (OS) application software to an information handling systems (IHS) when the OS application software is removed from a computer readable storage device of the IHS. The disclosed embodiments control the version of the OS application software being deployed to an IHS when deploying the software from the boot firmware. For example, the disclosed embodiments utilize a version identifier to specify which version of the OS application software should be restored, a Content Deliver Network (CDN) server to store multiple versions of the OS application software, and a registration web server to map a device identifier corresponding to the IHS and the version identifier corresponding to the specified version of the OS application software to a universal resource locator (URL) link identifying where the specified version of the OS application software is stored within the CDN server.

20 Claims, 5 Drawing Sheets

SYSTEMS AND METHODS TO CONTROL SOFTWARE VERSION WHEN DEPLOYING OS APPLICATION SOFTWARE FROM THE BOOT FIRMWARE

FIELD

This invention relates generally to information handling systems (IHSs), and more particularly, to systems and methods for restoring operating system (OS) application software to an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems (IHSs) typically include a boot system such as, for example, a Basic Input/Output System (BIOS) or Unified Extensible Firmware Interface (UEFI) that operates to initialize hardware components during the boot process and to provide runtime services for operating systems and application programs. The boot system code is implemented as boot firmware, which is typically stored in non-volatile memory, such as read only memory (ROM) and/or a Flash memory device.

In some information handling systems, a small amount of boot code (e.g., a "boot block") may be stored in ROM, while the majority of the boot code (e.g., a "main BIOS image") is stored in a Flash memory device. Upon system start-up or reboot, a processing device (such as a central processing device, CPU, or an embedded controller, EC) may execute the boot block stored in ROM to initiate the boot process, retrieve the main BIOS image from the Flash memory device and store the main BIOS image in system memory. The processing device may then execute boot code within the main BIOS image to test and initialize the IHS hardware components, perform a Power-On Self-Test (POST) to ensure the hardware configuration is valid and working properly, load an operating system (OS) from a computer readable storage device to the system memory, and/or perform a variety of other actions known in the art. One example of an operating system is the Windows OS provided by Microsoft.

The Windows Platform Binary Table (WPBT) is a mechanism provided by Microsoft, via the boot firmware, to publish a platform binary to the operating system for execution during OS runtime. This mechanism leverages a boot firmware component to publish a platform binary in system memory using a fixed Advanced Configuration and Power Interface (ACPI) table. Although multiple WPBTs may be included within an ACPI table, only one platform binary is supported in each WPBT. The platform binary is contained within the boot block stored in ROM, and thus, is fixed once the boot block image is burned in ROM.

During operating system initialization, the OS may read the first WPBT in the ACPI table, retrieve the platform binary specified within the WPBT from the boot block and execute the platform binary. The platform binary is a native, user-mode application, which is executed by the Windows Session Manager Sub System (SMSS) during operating system initialization. The platform binary installs a platform binary service, such as a Windows service, which can be executed by the Windows Service Control Manager (SCM) during OS runtime to perform various functions.

Figure 1:
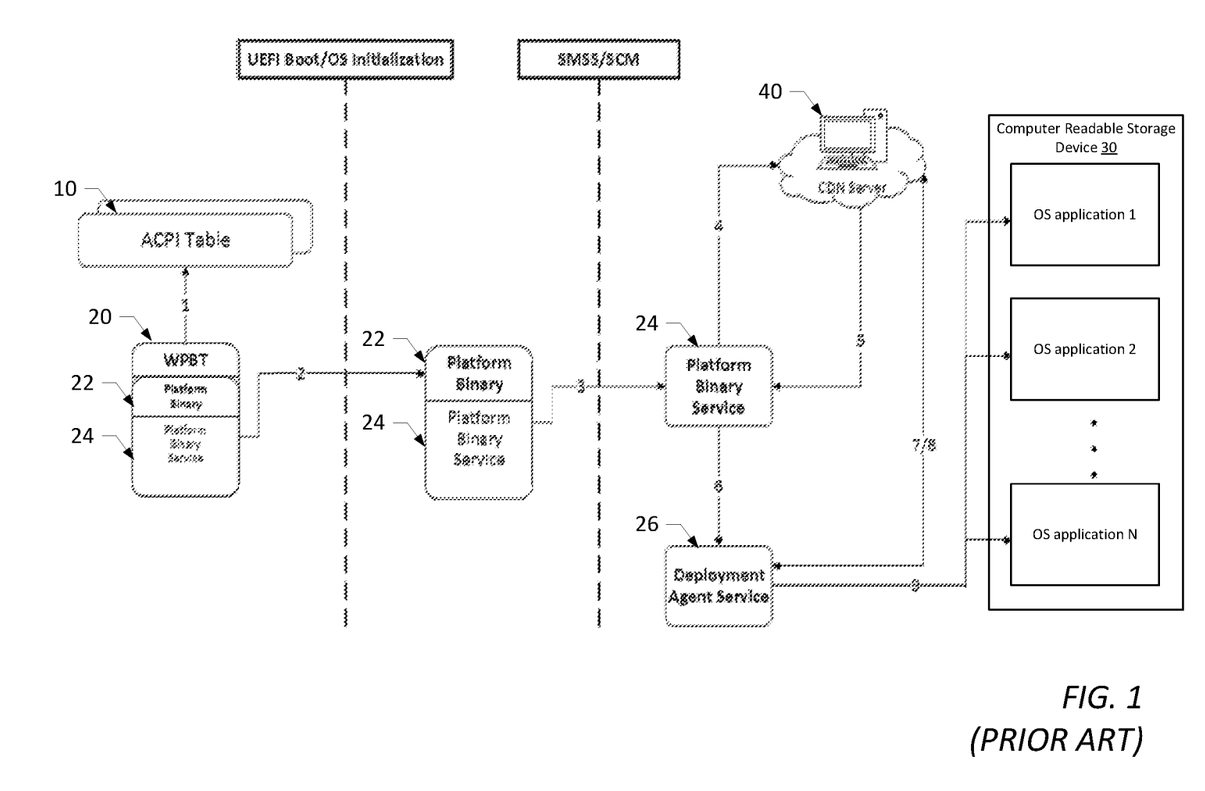
FIG. 1 (Prior Art) is a process flow diagram illustrating a conventional method to restore operating system (OS) application software to a computer readable storage device of an information handling system (IHS) using a Windows Platform Binary Table (WPBT)

In some cases, an independent software vendor (ISV) or original equipment manufacturer (OEM) may wish to have their critical software deployed to the device indefinitely, even when the OS has been changed or reinstalled in a "clean" configuration. One conventional approach to ensuring software "persistence" in an information handling system is to use the WPBT functionality to automatically reinstall or restore OS application software via the boot firmware. FIG. 1 provides an example of a conventional method that may be used to automatically restore one or more OS applications to a computer readable storage device of an information handling system after the OS has been changed or reinstalled in a "clean" configuration. As described in more detail below, the conventional approach shown in FIG. 1 uses a platform binary contained within a WPBT to retrieve one or more OS applications from a remote system.

The method shown in FIG. 1 begins when an IHS is rebooted after a change has been made to the operating system. During UEFI boot and OS initialization, the OS reads the first WPBT 20 in the ACPI table 10 (at step 1) and loads a platform binary 22 specified in the WPBT 20 into system memory (at step 2). The Windows SMSS then executes the platform binary 22 to install a platform binary service 24 (at step 3), which can be used during OS runtime to reinstall (or restore) one or more OS applications to a computer readable storage device 30 of the IHS.

Once the OS is booted, the Windows SCM executes the platform binary service 24 to access a remote system 40 (at step 4) and download a deployment agent installer from the remote system 40 (at step 5). In some cases, the remote system 40 may be Content Deliver Network (CDN) server comprising various OS applications and deployment agent installers, which may be downloaded to an IHS and used to install one or more of the OS applications contained within the CDN server. Each deployment agent installer and OS application may be stored within a unique location in the remote system 40 defined, for example, by a universal resource locator (URL) link. The platform binary service 24 contains fixed locations (e.g., fixed URL links) for downloading a particular deployment agent installer from the remote system 40. When executed by the Windows SCM, the platform binary service 24 may use a particular URL link contained within the service to download a particular deployment agent installer from the remote system 40 (at step 5).

After the deployment agent installer is downloaded from the remote system 40, the platform binary service 24 executes the deployment agent installer to install and start a deployment agent service 26 (at step 6). The deployment agent service 26 may utilize additional URL link(s) contained within the deployment agent service 26 to access (at step 7) and download (at step 8) one or more OS applications (e.g., OS applications 1, 2 . . . N), which are stored within the remote system 40 at fixed location(s) specified by the URL link(s). After retrieving the OS application(s) from the remote system 40, the deployment agent service 26 may store the OS application(s) within computer readable storage device 30 to reinstall or restore the OS application(s) after a change has been made to the operating system.

Although the conventional approach shown in FIG. 1 may utilize a WPBT to automatically reinstall or restore software (or firmware) to an information handling system, the conventional approach does not provide the capability to control the version of the software being deployed. There are several use cases in which this may present a problem.

First, OS application software can be run under different environments including, for example, development, QA validation, prerelease (or Beta) and formal Release. In some cases, a software development team may continue working on a new version of the OS application software after the platform binary 22 and platform binary service 24 have been burned into the boot firmware ROM image. For example, the software development team may initially create a development version, which may progress over time into QA, Beta and Release versions of the OS application software. A new version of deployment agent service 26 is required to download each new version of the OS application software. Although new versions of the deployment agent installer and OS applications may be stored within the remote system 40, the conventional approach shown in FIG. 1 is not capable of accessing and downloading the newer versions. Because the platform binary 22 and platform binary service 24 are part of the boot firmware ROM image, the fixed locations specified within the platform binary service 24 for downloading the deployment agent installer are hard-coded into the ROM image and cannot be changed to change the software version being deployed.

Second, information technology (IT) administrators like to control what software is installed on their devices and when they are upgraded. However, IT administrators cannot select a specific software version as the upgrade target using the conventional approach shown in FIG. 1 since a fixed location for the deployment agent installer is hard coded into the platform binary service 24 and cannot be changed.

A need, therefore, exists for an improved system and method to control the version of the OS application software being deployed to an information handling system when deploying the software from the boot firmware. More specifically, a need exists for an improved system and method for controlling software version when using a WPBT to automatically restore OS application software to an information handling system.

SUMMARY OF THE INVENTION

The following description of various embodiments of systems and related methods is not to be construed in any way as limiting the subject matter of the appended claims.

The present disclosure provides various embodiments of systems and computer implemented methods to automatically restore operating system (OS) application software to an information handling systems (IHS) when the OS application software is removed from a computer readable storage device of the IHS. Unlike conventional approaches, the embodiments disclosed herein control the version of the OS application software being deployed to an IHS when deploying the software from the boot firmware. For example, the disclosed embodiments utilize a version identifier to specify which version of the OS application software should be restored, a Content Deliver Network (CDN) server to store multiple versions of the OS application software, and a registration web server to map a device identifier corresponding to the IHS and the version identifier corresponding to the specified version of the OS application software to a universal resource locator (URL) link identifying where the specified version of the OS application software is stored within the CDN server. This enables the specified version of the OS application software to be retrieved from the CDN server and downloaded to the IHS when a Windows Platform Binary Table (WPBT) is used to automatically restore OS application software to the IHS.

According to one embodiment, the system in accordance with the present disclosure may include an information handling system (IHS) and a plurality of remote systems communicatively coupled to the IHS via a network. The IHS may generally include at least one computer readable non-volatile memory, a computer readable storage device and at least one processing device. The at least one computer readable non-volatile memory may be configured to store boot firmware and Advanced Configuration and Power Interface (ACPI) firmware. The computer readable storage device may be configured to store an operating system (OS) for the IHS, at least one OS application, a device identifier corresponding to the IHS, and a version identifier corresponding to a specified version of the at least one OS application. The at least one processing device may be configured to execute program instructions within the boot firmware and the ACPI firmware to automatically restore the specified version of the at least one OS application to the computer readable storage device if the at least one OS application is removed from the computer readable storage device.

In some embodiments, the plurality of remote systems may include a first remote system and a second remote system, which are communicatively coupled to the IHS via a network such as local area network (LAN) or a wide area network (WAN). In one embodiment, the first and second remote systems may be communicatively coupled to the IHS via a WAN, such as the Internet.

The first remote system may be configured to store multiple versions of the at least one OS application, and a deployment agent installer for each version of the at least one OS application stored within the first remote system. Each version of the at least one OS application and corresponding deployment agent installer may be stored within the first remote system at a location identified by a universal resource locator (URL) link. Although not strictly limited to such, the first remote system may be a Content Deliver Network (CDN) server, in some embodiments.

The second remote system may be configured to map the device identifier and the version identifier to a URL link identifying where the specified version of the at least one OS application and corresponding deployment agent installer is stored within the first remote system. In some embodiments, the second remote system may be configured to save the device identifier, the version identifier and the URL link within a map record stored within the second remote system. Although not strictly limited to such, the second remote system is a registration web server, in some embodiments.

In some embodiments, a deployment agent installer may be provided to the IHS before the at least one OS application is removed from the computer readable storage device. In such embodiments, the version identifier corresponding to the specified version of the at least one OS application may be attached to the deployment agent installer to specify which version of the at least one OS application to restore.

In some embodiments, the at least one processing device may be configured to execute program instructions within the deployment agent installer to store the version identifier attached to the deployment agent installer within an OS-accessible memory of the IHS. For example, the version identifier may be stored in the same region of the OS-accessible memory (e.g., the system registry) where the device identifier is stored. In addition, the at least one processing device may be configured to execute program instructions within the deployment agent installer to store a deployment agent service within the computer readable storage device of the IHS. Additional program instructions within the deployment agent installer may be executed to extract a platform binary service from the boot firmware and to store the platform binary service within the computer readable storage device of the IHS.

In some embodiments, the at least one processing device may be configured to execute program instructions within the platform binary service to: read the version identifier and the device identifier from the OS-accessible memory; and send a provisioning request to the second remote system via the network, wherein the provisioning request includes the device identifier and the version identifier read from the OS-accessible memory. Upon receiving the provisioning request, the second remote system may be configured to: save the device identifier, the version identifier and the URL link within a map record stored within the second remote system; and send the URL link to the platform binary service via the network.

In some embodiments, the at least one processing device may be configured to execute program instructions within the platform binary service to enable a Windows Platform Binary Table (WPBT) in the boot firmware. The WPBT includes a platform binary, which may be executed after the at least one OS application is removed from the computer readable storage device when the IHS is rebooted to install the platform binary service.

After the at least one OS application is removed from the computer readable storage device and the IHS is rebooted, the at least processing device may be configured to execute program instructions within the operating system to: read the WPBT and load the platform binary included within the WPBT into system memory; execute the platform binary loaded into system memory to install the platform binary service; and execute the platform binary service to access the second remote system and retrieve the URL link that identifies where the specified version of the at least one OS application and the corresponding deployment agent installer is stored within the first remote system.

In some embodiments, the at least one processing device may be configured to execute program instructions within the platform binary service to: read the device identifier from the OS-accessible memory; and send a discovery request to the second remote system via the network, wherein the discovery request includes the device identifier read from the OS-accessible memory. Upon receiving the discovery request, the second remote system may be configured to: use the device identifier included within the discovery request to obtain the map record corresponding to the device identifier; retrieve the URL link corresponding to the version identifier from the map record; and send the URL link to the platform binary service via the network.

In some embodiments, the at least one processing device may be configured to execute program instructions within the platform binary service to: download the deployment agent installer identified by the URL link from the first remote system; and execute the deployment agent installer to install and start the deployment agent service.

In some embodiments, the at least one processing device may be configured to execute program instructions within the deployment agent service to: use a URL link previously provided to the deployment agent service to access the first remote system and retrieve the specified version of the at least one OS application; and store the specified version of the at least one OS application retrieved from the first remote system within the computer readable storage device.

According to another embodiment, a computer-implemented method is provided herein to automatically restore at least one operating system (OS) application to an information handling system (IHS) when the at least one OS application is removed from a computer readable storage device of the IHS. The computer implemented method may be performed by an IHS, as set forth above.

In some embodiments, the computer implemented method may include: reading a device identifier and a version identifier from an OS-accessible memory of the IHS, wherein the device identifier corresponds to the IHS and the version identifier corresponds to a specified version of the at least one OS application; and sending a provisioning request over a first network to a remote registration server communicatively coupled to the IHS via the first network, wherein the provisioning request includes the device identifier and the version identifier. As noted above, the remote registration server may be configured to map the device identifier and the version identifier to a universal resource locator (URL) link identifying where the specified version of the at least one OS application and corresponding deployment agent installer are stored within a Content Deliver Network (CDN) server. In some embodiments, the remote registration server may be configured to store the device identifier, the version identifier and the URL link within a map record.

The computer implemented method may further include rebooting the IHS when the at least one OS application is removed from the computer readable storage device of the IHS; using the device identifier to access the registration web server and retrieve the URL link corresponding to the device identifier and the version identifier; and using the URL link to restore the specified version of the at least one OS application to the computer readable storage device.

In some embodiments, said using the device identifier to access the registration web server and retrieve the URL link may include: reading the device identifier from the OS-accessible memory; sending a discovery request over the first network to the remote registration server, wherein the discovery request includes the device identifier read from the OS-accessible memory; and receiving the URL link from the remote registration server via the first network.

In some embodiments, said using the URL link to restore the specified version of the at least one OS application to the computer readable storage device may include: using the URL link retrieved from the registration web server to access the CDN server and retrieve the deployment agent installer corresponding to the specified version of the at least one OS application; receiving the deployment agent installer from the CDN server via the first network; executing the deployment agent installer to install and start the deployment agent service, which uses a URL link previously provided to the deployment agent service to access the registration web server and retrieve the specified version of the at least one OS application from the CDN server; receiving the specified version of the at least one OS application from the CDN server via the first network; and storing the specified version of the at least one OS application received from the CDN server within the computer readable storage device.

In some embodiments, the computer implemented method may perform one or more steps prior to reading the device identifier and the version identifier from the OS-accessible memory. For example, computer implemented method may include: receiving the version identifier corresponding to the specified version of the at least one OS application from an administrator IHS communicatively coupled to the IHS via a second network; and storing the version identifier within the OS-accessible memory.

In some embodiments, the specified version of the at least one OS application may correspond to a version of the at least one OS application, which is selected by an information technology (IT) administrator to control the version of the at least one OS application restored to the IHS. For example, the IT administrator select a specific software version as the upgrade target for the at least one OS application, and may provide a version ID corresponding to the selected version of the at least one OS application to the IHS.

In other embodiments, the specified version of the at least one OS application may correspond to a version of the at least one OS application, which is selected by a software developer to control the version of the at least one OS application restored to the IHS. For example, the software developer may select between development, QA validation, prerelease and release versions of the at least one OS application, and may provide a version ID corresponding to the selected version of the at least one OS application to the IHS.

BRIEF DESCRIPTION OF THE DRAWINGS

Other advantages of the present disclosure will become apparent upon reading the following detailed description and upon reference to the accompanying drawings in which.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

Figure 2:
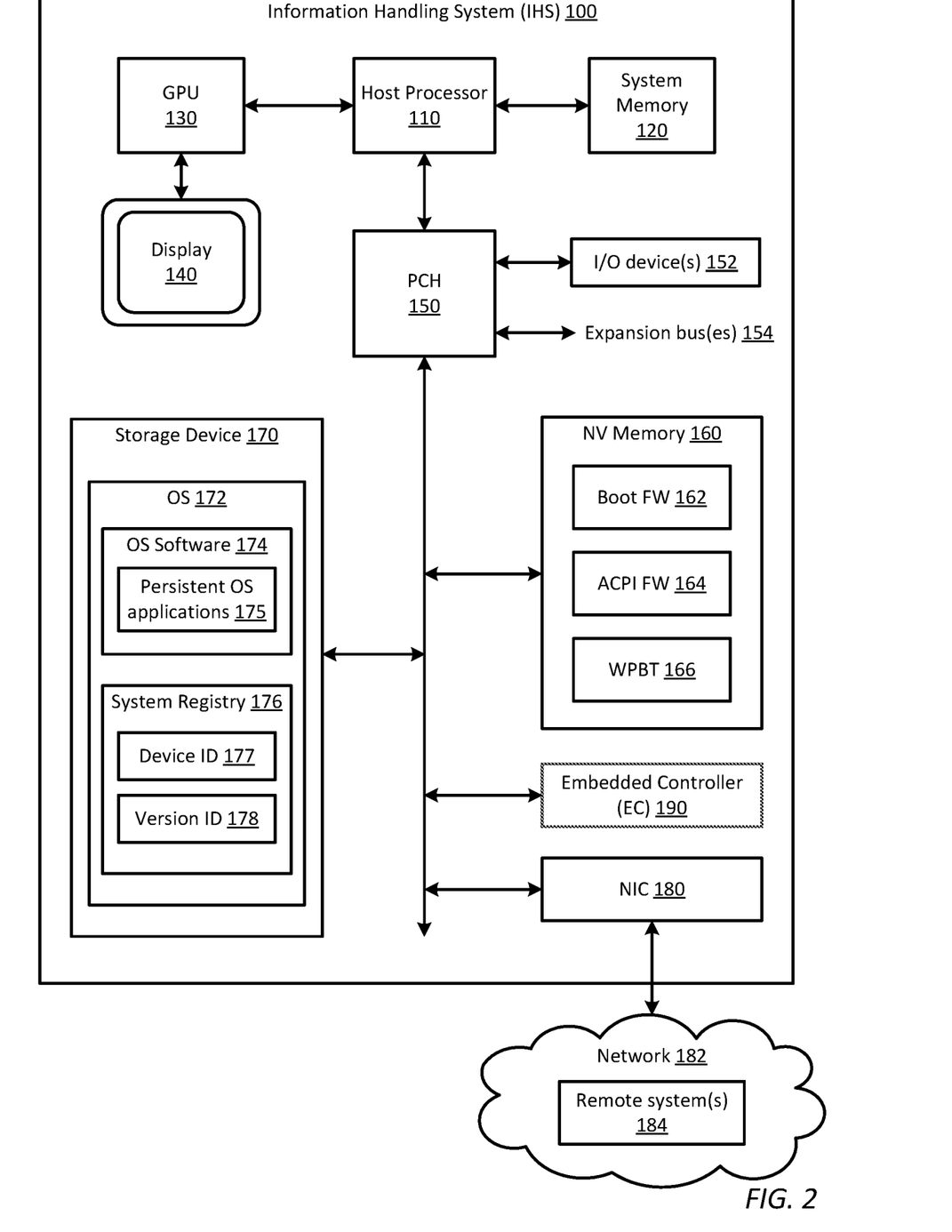
FIG. 2 is a block diagram illustrating one embodiment of an information handling system (IHS) according to one embodiment of the present disclosure.

FIG. 2 is a block diagram of an information handling system 100 (e.g., a desktop computer, laptop computer, tablet computer, server, Internet of Things (IoT) device, etc.) as it may be configured according to one embodiment of the present disclosure. As shown in FIG. 2, IHS 100 may generally include at least one processing device 110 (e.g., a host processor), a system memory 120, a graphics processor unit (GPU) 130, a display device 140, a platform controller hub (PCH) 150, input/output (I/O) devices 152, expansion bus(es) 154, a computer readable non-volatile (NV) memory 160, a computer readable storage device 170, a network interface card (NIC) 180 and an embedded controller (EC) 190.

It is expressly noted that the IHS configuration shown in FIG. 2 is exemplary only, and that the methods disclosed herein may be implemented on any type and/or configuration of information handling system having one or more processing devices, a computer readable non-volatile memory, a computer readable storage device and a network interface card. It will be further understood that while certain components of the information handling system are shown in FIG. 2 for illustrating embodiments of the present disclosure, the information handling system disclosed herein is not restricted to including only those components shown in FIG. 2 and described below.

Host processor 110 may include various types of programmable integrated circuits (e.g., a processor such as a controller, microcontroller, microprocessor, ASIC, etc.) and programmable logic devices (such as a field programmable gate array "FPGA", complex programmable logic device "CPLD", etc.). According to one embodiment, host processor 110 may include at least one central processing unit (CPU) having one or more processing cores. The CPU may include any type of processing device, such as an Intel Pentium series processor, an Advanced Micro Devices (AMD) processor or another processing device.

System memory 120 is coupled to host processor 110 and generally configured to store program instructions (or computer program code), which are executable by host processor 110. System memory 120 may be implemented using any suitable memory technology, including but not limited to, random access memory (RAM), static RAM (SRAM), dynamic RAM (DRAM), synchronous dynamic RAM (SDRAM), non-volatile RAM (NVRAM), erasable programmable ROM (EPROM), electrically erasable programmable ROM (EEPROM), Flash memory, or any other type of volatile memory.

Graphics processor unit (GPU) 130 is coupled to host processor 110 and configured to coordinate communication between the host processor and one or more display components of the IHS. In the embodiment shown in FIG. 2, GPU 130 is coupled to display device 140 and configured to provide visual images (e.g., a graphical user interface, messages and/or user prompts) to the user. Although GPU 130 is shown as a separate processing device in the embodiment of FIG. 2, GPU 130 may be omitted in other embodiments, when the functionality provided thereby is integrated within host processor 110 in a system-on-chip (SoC) design.

Platform controller hub (PCH) 150 is coupled to host processor 110 and configured to handle I/O operations for the IHS. As such, PCH 150 may include a variety of communication interfaces and ports for communicating with various system components, such as input/output (I/O) devices 152, expansion bus(es) 154, computer readable NV memory 160, computer readable storage device 170, NIC 180 and EC 190. Examples of communication interfaces and ports that may be included within PCH 150 include, but are not limited to, a Peripheral Component Interconnect (PCI) interface, a PCI-Express (PCIe) interface, a Serial Peripheral Interface (SPI), an Enhanced SPI (eSPI), a Serial AT Attachment (SATA) interface, a Low Pin Count (LPC) interface, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface. Examples of expansion bus(es) 154 that may be coupled to PCH 150 include, but are not limited to, a PCI bus, a PCIe bus, a SATA bus, a USB bus, etc.

I/O devices 152 enable the user to interact with IHS 100 and software/firmware executing thereon. In some embodiments, one or more I/O devices 152 may be provided within IHS 100. In other embodiments, I/O device(s) 152 may be separate from the IHS and may interact with the IHS through a wired or wireless connection. Examples of I/O devices 152 include, but are not limited to, keyboards, keypads, touch screens, mice, scanning devices, voice or optical recognition devices, and any other devices suitable for entering or retrieving data.

Computer readable storage device 170 may be any type of persistent, non-transitory computer readable storage device, such as one or more hard disk drives (HDDs) or solid-state drives (SSDs), and may be generally configured to store software and/or data. For example, computer readable storage device 170 may be configured to store an operating system (OS) 172 for the IHS, in addition to other software and/or firmware modules and user data.

OS 172 may contain program instructions (or computer program code), which may be executed by host processor 110 to perform various tasks and functions for the information handling system and/or for the user. In one embodiment, OS 172 may be one of the many Windows® operating systems provided by Microsoft. As known in the art, OS 172 may include OS software 174 and a system registry 176. OS software 174 may generally include operating system files, applications, services, hardware drivers, etc. In some embodiments, OS software 174 may include one or more persistent OS applications 175, i.e., applications that an ISV or OEM wishes to remain within the computer readable storage device 170 indefinitely, even when the OS 172 is changed or reinstalled in a "clean" configuration.

As known in the art, the system registry 176 stores information and settings for software programs, hardware devices, user preferences, operating system configurations, and much more. More specifically, the system registry 176 is a hierarchical database of data that is critical to the operation of OS 172 and the OS system files, applications, services and hardware drivers that run in the OS environment. In some embodiments, a device identifier (or "device ID") 177 and a version identifier (or "version ID") 178 may be stored within the system registry 176. The device ID 177 may correspond to and uniquely identify the IHS 100. The version ID 178 may correspond to and uniquely identify a specific version of the persistent OS application(s) 175 to be restored to the IHS 100 if/when the persistent OS application(s) 175 are removed from computer readable storage device 170.

Computer readable memory 160 may include any type of non-volatile (NV) memory including, but not limited to, Flash memory (e.g., SPI Flash memory) and non-volatile RAM (NVRAM), and may be generally configured to store software and/or firmware modules. The software and/or firmware modules stored within the computer readable NV memory 160 contain program instructions (or computer program code) that may be executed by the host processor 110 and/or the EC 190.

In the embodiment shown in FIG. 2, the computer readable NV memory 160 is configured to store boot firmware (Boot FW) 162 and Advanced Configuration and Power Interface (ACPI) firmware 164, in addition to other software/firmware modules (not shown). The computer readable NV memory 160 is further configured to store a Windows Platform Binary Table (WPBT) 166 containing a platform binary, which may be used to retrieve one or more OS applications from a remote system, such as remote system 184.

Boot firmware 162 may be implemented as a Basic Input/Output System (BIOS) and/or a Unified Extensible Firmware Interface (UEFI), and may generally include software and/or firmware modules for specifying hardware configuration settings, system date/time, boot sequence, etc. In some embodiments, a small amount of the boot firmware 162 code (e.g., a "boot block") may be stored in ROM (e.g., EC ROM), while the majority of the boot firmware 162 code (e.g., a "main BIOS image") is stored in a Flash memory device. In some embodiments, the platform binary contained within the WPBT 166 may be included within the boot firmware ROM image.

As known in the art, boot firmware 162 may generally include boot services and runtime services. Boot services are available for execution when the boot firmware owns the system platform during a pre-boot phase of a system boot (or reboot) before the OS 172 is loaded and running. Runtime services, on the other hand, are available for execution while the OS 172 is running (i.e., during OS runtime).

ACPI firmware 164 serves as an interface layer between the boot firmware 162 and the OS 172, and provides OS-independent interfaces between the platform hardware and OS-specific technologies, interfaces and code. As known in the art, ACPI firmware 164 includes ACPI tables, ACPI BIOS and ACPI registers. During the pre-boot phase of a system boot (or reboot), the ACPI firmware 164 communicates available hardware components and their functions to OS 172 using boot services provided by boot firmware 162, constructs all ACPI tables and populates the interfaces and handlers to be used during OS runtime. The ACPI tables constructed during the pre-boot phase are used during OS runtime to provide ACPI runtime services to OS 172, and include hooks to all handlers where the runtime services are called.

Figure 3:
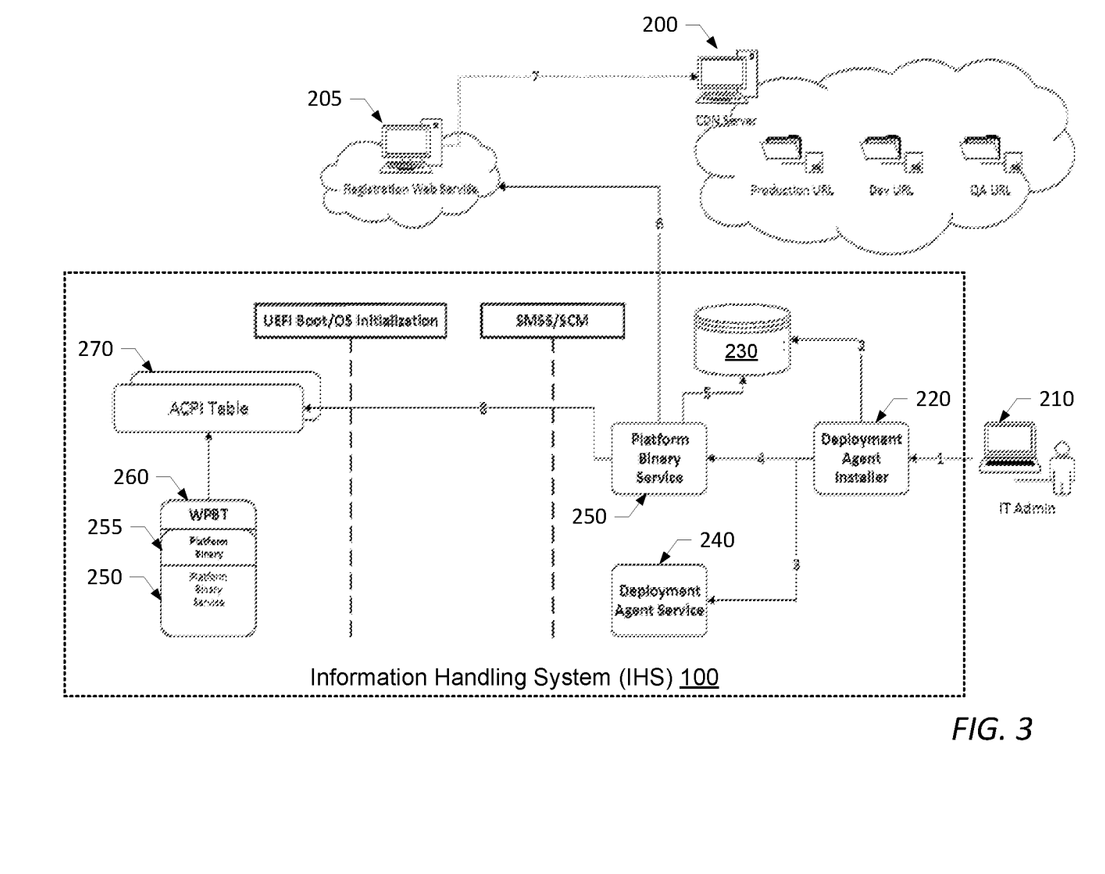
FIG. 3 is a system/process flow diagram illustrating an improved system and process flow that may be used to provision the system to ensure software persistence in an information handling system.
Figure 4:
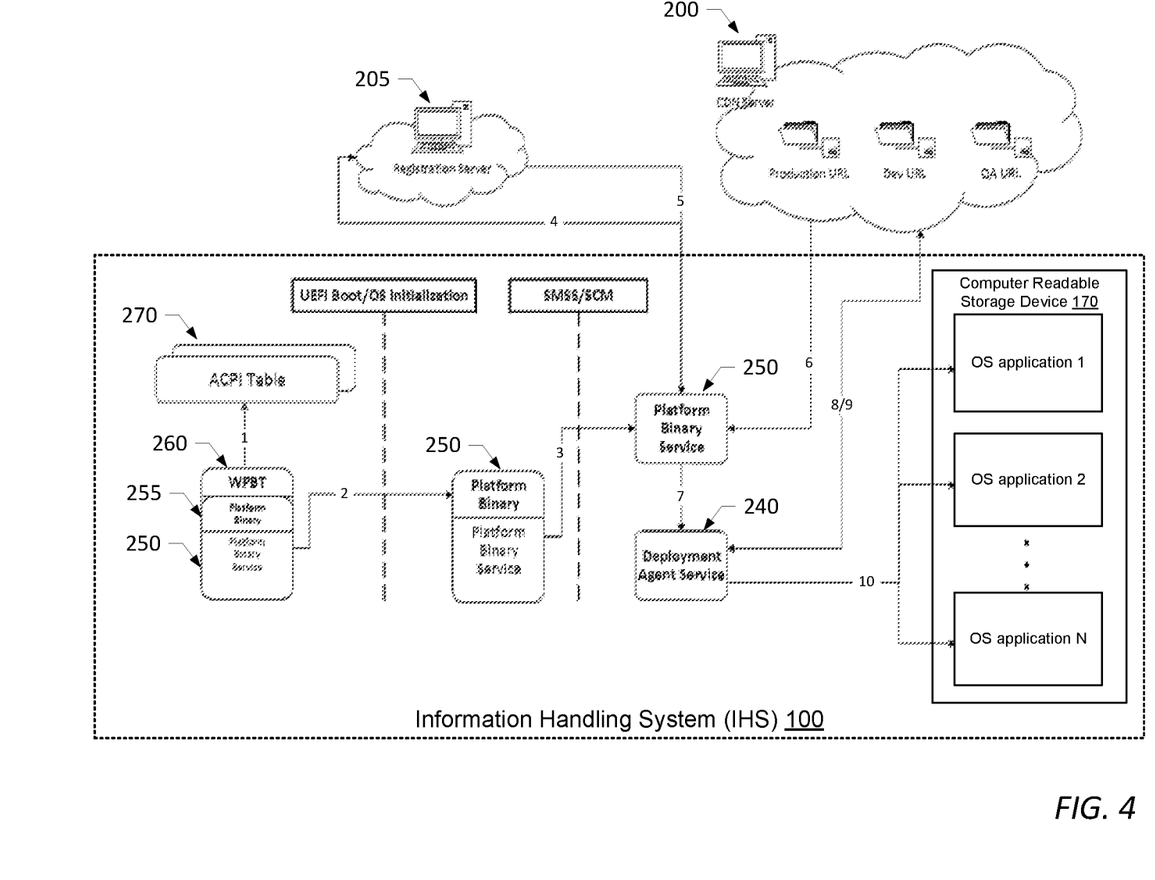
FIG. 4 is a system/process flow diagram illustrating an improved system and process flow that may be used to automatically restore one or more persistent OS applications to the computer readable storage device if/when the persistent OS application(s) are removed from the computer readable storage device.

NIC 180 enables IHS 100 to communicate with one or more remotely located systems ("remote system(s)") 184 via an external network 182. In some embodiments, IHS 100 may use NIC 180 to access one or more remote systems 184 (e.g., one or more network connected servers, or a server cloud). In one example embodiment, the remote system(s) 184 shown in FIG. 2 may include a registration web service/server and a Content Deliver Network (CDN) server, as shown in FIGS. 3 and 4 and described in more detail below.

NIC 180 may communicate data and signals to/from the remote system(s) 184 via the external network 182 using any known communication protocol or combination of communication protocols. Network 182 may be a local area network (LAN), wide area network (WAN), personal area network (PAN), or the like, and the connection to and/or between IHS 100 and network 182 may be wired, wireless or a combination thereof. For purposes of this discussion, network 182 is indicated as a single collective component for simplicity. However, it is appreciated that network 182 may comprise one or more direct connections to other remote systems and/or services, as well as a more complex set of interconnections as can exist within a wide area network, such as the Internet.

Embedded controller (EC) 190 may generally include read only memory (ROM), random access memory (RAM) and a processing device (e.g., a controller, microcontroller, microprocessor, ASIC, etc.) for executing program instructions stored within its internal ROM and RAM. In some embodiments, EC 190 may be configured to boot the information handling system and perform other functions. For example, EC 190 may store execute program instructions (e.g., a boot block) stored within its internal ROM to initiate a boot process for the information handling system.

When IHS 100 is powered on or rebooted, the processing device of EC 190 may initiate a boot process for the information handling system by executing the boot block stored within the EC ROM while PCH 150 and host processor 110 are in reset. As used herein, an IHS "boot process" is a process or set of operations performed by an information handling system component (e.g., EC 190 and/or host processor 110) to load and execute a boot system (e.g., BIOS and/or UEFI) and prepare the system for OS booting. When the host processor 110 out of reset, the host processor retrieves the boot firmware 162 from computer readable NV memory 160, stores a local copy of the boot firmware within system memory 120, and executes the boot firmware to configure hardware components of the IHS, perform a Power-On Self-Test (POST), discover and initialize devices, and launch a bootloader within boot firmware 162 to load OS 172. Once launched, the bootloader retrieves OS 172 from the computer readable storage device 170 and loads it into system memory 120. Once the OS 172 is loaded, the host processor 110 may begin executing the OS software 174 contained within OS 172 to perform various functions for the IHS 100.

In some cases, a user or IT administrator may change the OS 172 or reinstall the OS 172 in a "clean" configuration. When this occurs, the OS software 174 stored within the computer readable storage device 170 may also be changed, which may cause OS applications to be deleted or removed from the computer readable storage device 170. In some cases, one or more of the OS applications removed from the computer readable storage device 170 may be persistent OS application(s) 175, or OS applications that are designated to be stored within the computer readable storage device 170 indefinitely. In other words, persistent OS application(s) 175 are OS applications that should be restored if they are deleted or removed from the computer readable storage device 170 when the OS 172 is changed or reinstalled in a "clean" configuration.

To provide software persistence, the present disclosure provides embodiments of systems and methods to automatically restore one or more persistent OS applications 175 to a computer readable storage device 170 when an operating system is changed or reinstalled in a "clean" configuration. Like the conventional approach shown in FIG. 1, the embodiments disclosed herein utilize a Windows Platform Binary Table (e.g., WPBT 166/260) to automatically restore one or more persistent OS applications 175, via the boot firmware 162, after the operating system has been changed or reinstalled in a "clean" configuration. Like the conventional approach, the WPBT utilized in the disclosed embodiments includes a platform binary, which is hard coded in the boot block image stored in ROM.

Unlike the conventional approach shown in FIG. 1, the embodiments disclosed herein control the version of the persistent OS application(s) 175 restored to the computer readable storage device 170. For example, the disclosed embodiments use a version identifier (or "version ID") to specify which version of the OS application software should be restored. The version ID may be stored within the IHS 100 in any substantially location, which is accessible to the operating system. In some embodiments, the version ID may be stored within the system registry 176, so that it may be accessed by an OS service, such as the platform binary service 250 shown in FIGS. 3 and 4 and discussed in more detail below.

FIGS. 3 and 4 illustrate embodiments of an improved system and method that may be used to automatically restore one or more persistent OS applications to a computer readable storage device of an information handling system. In particular, FIG. 3 illustrates a system and process flow that may be used to provision the system to ensure software persistence in an information handling system. Once the system is provisioned, the system and process flow shown in FIG. 4 may be used to automatically restore one or more persistent OS applications to the computer readable storage device if/when the persistent OS application(s) are deleted or removed from the computer readable storage device.

The system shown in FIGS. 3 and 4 includes an information handling system (such as IHS 100), a Content Delivery Network (CDN) server 200 and a registration web service/server 205. The IHS 100 may include various hardware, software and firmware components, as described above in reference to FIG. 2. For example, the IHS 100 may include a computer readable non-volatile memory 160, a computer readable storage device 170 and at least one processing device (e.g., host processor 110 and/or EC 190). Other components may also be included within the IHS 100 as is known in the art.

As described above in reference to FIG. 2, the computer readable non-volatile memory 160 may store boot firmware 162 and ACPI firmware 164. The computer readable storage device 170 may store an OS 172 for the IHS, one or more persistent OS applications 175, a device identifier (or device ID) 177 corresponding to the IHS, and a version identifier (version ID) 178 corresponding to a particular version of the persistent OS application(s) 175 stored therein. In some embodiments, the at least one processing device (e.g., host processor 110 and/or EC 190) may execute program instructions within the boot firmware 162, the ACPI firmware 164 and the OS 172 to provision the system shown in FIG. 3. In other embodiments, the at least one processing device may execute additional program instructions within the boot firmware 162, the ACPI firmware 164 and the OS 172 to automatically restore at least one persistent OS application 175 to the computer readable storage device 170 if/when the at least one persistent OS application 175 is removed from the computer readable storage device 170.

The CDN server 200 and the registration web service/server 205 are remote systems 184, which are communicatively coupled to the IHS 100 via a network (e.g., a LAN or WAN), such as the network 182 shown in FIG. 2 and described above. The CDN server 200 stores copies of the persistent OS application(s) 175 stored within the computer readable storage device 170 and deployment agent installer(s), which can be downloaded to the IHS 100 and used to restore the persistent OS application(s) 175 to the IHS. In some embodiments, the CDN server 200 may store a plurality of OS applications and a plurality of deployment agent installers for downloading and installing the plurality of OS applications.

In some embodiments, multiple versions of the OS applications and the deployment agent installers may be stored within CDN server 200. In one example, CDN server 200 may contain development, QA validation, prerelease (or Beta) and formal Release versions of one or more OS applications. For each version of the one or more OS applications stored within the CDN server 200, a corresponding deployment agent installer may also be stored. Each version of the OS application(s) and the deployment agent installer(s) may be stored within a different location within the CDN server 200. In some embodiments, a universal resource locator (URL) link may be used to identify locations within the CDN server 200 where the various versions of the OS application(s) and the deployment agent installer(s) are stored.

The registration web service/server 205 maps the device identifier (or device ID) 177 and the version identifier (version ID) 178 to a location within the CDN server 200 (e.g., a specific URL link) where a particular version of an OS application and deployment agent installer corresponding to the device ID and the version ID is stored. In some embodiments, the registration web service/server 205 may comprise a Representational State Transfer (REST) Application Program Interface (API), which correlates the device ID 177 and the version ID 178 to a URL link identifying the location within the CDN server 200 where a particular version of the OS application and the deployment agent installer is stored.

In some embodiments, the registration web service/server 205 (and/or the REST API) may store the device ID 177, the version ID 178 and the corresponding URL link within a map record. In some embodiments, the registration web service/server 205 (and/or the REST API) may store a plurality of map records within a table, where each map record is associated with a different device ID (i.e., a different information handling system). In some embodiments, each map record may include a device ID, one or more version IDs and one or more URL link(s). Each version ID included within the map record may correspond to a different version of an OS application and corresponding deployment agent installer. For each version ID included within the map record, a URL link may be included to identify a location within the CDN server 200 where a version of the OS application and deployment agent installer corresponding to the version ID is stored. If more than one persistent OS application 175 is stored within the IHS 100, a map record may include one or more version IDs and corresponding URL link(s) for each OS application associated with the device ID.

Once the map records are generated and stored, the registration web service/server 205 (and/or the REST API) uses the map records to determine where particular versions of the OS applications and corresponding deployment agent installers are stored within the CDN server 200. In some embodiments, the registration web service/server 205 (and/or the REST API) may receive a device ID 177 from the IHS 100, and may use the device ID 177 to retrieve a map record containing: (a) a version ID associated with a particular version of an OS application software to be restored to the IHS 100, and (b) a URL link identifying the location within the CDN server 200 where a deployment agent installer corresponding to the particular version of the OS application software is stored.

In other embodiments, the registration web service/server 205 (and/or the REST API) may receive a device ID 177 and a version ID 178 from the IHS 100. In such embodiments, the registration web service/server 205 (and/or the REST API) may use the device ID 177 and the version ID 178 to retrieve a map record containing a URL link identifying the location within the CDN server 200 where a version of the deployment agent installer corresponding to the device ID 177 and the version ID 178 is stored.

The system and process flow shown in FIG. 3 ensures software persistence in an information handling system (such as IHS 100) by providing a device ID corresponding to the IHS 100, and a version ID for any persistent OS application(s) 175 stored within the IHS 100, to the registration web service/server 205. The registration web service/server 205 maps the device ID and the version ID(s) to URL links identifying the location(s) within the CDN server 200 where copies of the OS application(s) and deployment agent installer(s) corresponding to the device ID and the version ID(s) are stored. A similar mapping is also provided to a deployment agent service 240, which may be subsequently deployed by the boot firmware 162 and used to restore the persistent OS application(s) 175 to the IHS 100, as described in more detail below in reference to FIG. 4.

An embodiment of a process used to provision the system will now be described in more detail with reference to FIG. 3. In some embodiments, an information technology (IT) administrator, a software developer or another user may initiate the provisioning process shown in FIG. 3 via actions performed at an administrator IHS 210. Like the IHS 100, the administrator IHS 210 may comprise a wide variety of information handling systems, such as, a desktop computer, laptop computer, tablet computer, etc. The administrator IHS 210 may be communicatively coupled to the IHS 100 via a network, such as network 182 of FIG. 2.

In some embodiments, an IT administrator, a software developer or another user may utilize the software, hardware and network capabilities of the administrator IHS 210 to manage a plurality of information handling systems (including IHS 100) and to select and control which version of the persistent OS application(s) 175 are restored to the IHS 100 in the restoration process shown in FIG. 4. For example, an IT administrator, a software developer or another user may control which version of the persistent OS application(s) 175 are restored to the IHS 100 in the restoration process shown in FIG. 4 by sending data and program instructions to the IHS 100 during the provisioning process shown in FIG. 3. The data and program instructions may be sent to the IHS 100 over a network (e.g., a LAN or WAN) connecting the administrator IHS 210 to the IHS 100.

In some embodiments, an IT administrator, a software developer or another user may initiate the provisioning process shown in FIG. 3 by sending a deployment agent installer 220 from the administrator IHS 210 to the IHS 100 (at step 1). The IT administrator (or the administrator IHS 210) may attach a particular version ID to the deployment agent installer 220 to indicate which version of the deployment agent service 240 should be deployed by the boot firmware 162 to restore the specified version of an OS application to the IHS 100. In other words, the version ID attached to the deployment agent installer 220 (at step 1) in FIG. 3 will determine the version of the deployment agent service 240 that is deployed in FIG. 4 to restore the specified version of an OS application to the IHS 100.

Upon receiving the deployment agent installer 220, a processing device of the IHS 100 may execute program instructions within the installer to store the version ID within an OS-accessible memory 230 (at step 2). In some embodiments, the version ID may be stored within the system registry 176, as noted above. In addition to the storing the version ID, the deployment agent installer 220 may also store a deployment agent service 240 and a platform binary service 250 within a computer readable storage device of the IHS (not shown in FIG. 3), and may set a flag in the system registry 176 that tells the platform binary service 250 to turn on a Windows Platform Binary Table (WPBT) 260 in the boot firmware. After all components are laid down in storage, the processing device of the IHS 100 may execute additional program instructions within the deployment agent installer 220 to start the deployment agent service 240 (at step 3), and at the same time, start the platform binary service 250 (at step 4) to provision the deployment agent service 240.

In order to provision the deployment agent service 240, the processing device of the IHS 100 may execute program instructions within the platform binary service 250 to read the version ID (at step 5), which was previously stored in the OS-accessible memory 230 by the deployment agent installer 220 (at step 2). The platform binary service 250 may also read a device ID corresponding to the IHS 100 from the OS-accessible memory 230 (at step 5).

Next, the processing device of the IHS 100 may execute program instructions within the platform binary service 250 to send a provisioning request to the registration web service/server 205 (at step 6), which includes the device ID and the version ID read from the OS-accessible memory 230 (at step 5). In some embodiments, the device ID and the version ID may be sent as tokens within the provisioning request sent to the registration web service/server 205 (at step 6).

Upon receiving the provisioning request, the registration web service/server 205 may execute program instructions contained therein (e.g., program instructions contained with a REST API) to map the device ID and the version ID to a URL link identifying a location within the CDN server 200 where a version of a deployment agent installer corresponding to the device ID and the version ID is stored (at step 7). In some embodiments, the registration web service/server 205 may save the device ID, the version ID and URL link within a map record, as set forth above.

After the map record is generated, the registration web service/server 205 may provide the mapping back to the platform binary service 250. For example, the registration web service/server 205 may send the URL link, which identifies the location where the version of the deployment agent installer corresponding to the device ID and the version ID is stored within the CDN server 200, back to the platform binary service 250.

In addition, the processing device of the IHS 100 may execute program instructions within the platform binary service 250 to read the flag, which was set by the deployment agent installer 220 in the system registry 176 when the deployment agent installer was installed (at step 2). The flag instructs the platform binary service 250 to enable a Windows Platform Binary Table (WPBT) 260 stored in the ACPI table 270 (at step 8), so that the boot firmware can later deploy the deployment agent service 240 if/when one or more persistent OS applications 175 are removed from the computer readable storage device 170. Turning on the WPBT 260 (at step 8) enables the operating system to read the WPBT 260 stored in the ACPI table 270 when the IHS 100 is later rebooted in the process flow shown in FIG. 4, extract a copy of the platform binary service 250 specified in the WPBT 260, and overwrite the one that the deployment agent installer 220 installed into the system memory.

As noted above, the WPBT 260 includes a platform binary 255, which is stored within the boot firmware (e.g., boot block) image stored in ROM. This platform binary 255 is hard coded into the boot firmware ROM image and cannot be changed. When the platform binary 255 is subsequently executed in the process flow shown in FIG. 4, however, the platform binary 255 installs the platform binary service 250 that was previously used to provision the registration web service/server 205 and the deployment agent service 240 in the process flow shown in FIG. 3. By provisioning the registration web service/server 205 and the deployment agent service 240, as set forth above, the platform binary service 250 can use the device ID in the process flow shown in FIG. 4 to discover where copies of deployment agent installer(s) corresponding to a specified version of the OS application(s) are located within the CDN server 200.

The process flow shown in FIG. 4 may be performed when an information handling system (such as IHS 100) is rebooted after the operating system (e.g., OS 172) has been changed or reinstalled in a "clean" configuration. As noted above, one or more persistent OS applications 175 may be removed from a computer readable storage 170 of the IHS 100 when the operating system is changed or reinstalled. When this occurs, the process flow shown in FIG. 4 may be performed to automatically restore the persistent OS application(s) 175 to the computer readable storage device 170.

During UEFI boot and OS initialization, the "new" operating system reads the first WPBT 260 in the ACPI table 270 (at step 1) and loads the platform binary 255 specified in the WPBT 260 into system memory (at step 2). After the platform binary 255 is loaded into system memory, an OS service (e.g., a Windows SMSS) executes the platform binary 255 to install the platform binary service 250 (at step 3). Once the "new" operating system is booted, another OS service (e.g., a Windows SCM) executes the platform binary service 250 to access the registration web service/server 205 (at step 4). In some embodiments, the platform binary service 250 may access the registration web service/server 205 by reading the device ID from an OS-accessible memory 230 and sending the device ID to the registration web service/server 205 in a discovery request.

Upon receiving the discovery request, the registration web service/server 205 uses the device ID contained within the discovery request to obtain a map record corresponding to the device ID. As noted above, the map record corresponding to the device ID may include a version ID corresponding to a specified version of the OS application and a URL link corresponding to a location within the CDN server 200 where a deployment agent installer corresponding to the version ID is stored. Once the map record is obtained, the registration web service/server 205 retrieves the URL link corresponding to the version ID from the map record, and sends the URL link to the platform binary service 250 (at step 5). In some embodiments, the URL link sent to the platform binary service 250 may correspond to a version ID, which was attached by the IT administrator to the deployment agent installer 220 during the provisioning process.

The platform binary service 250 uses the URL link received from the registration web service/server 205 (at step 5) to download the deployment agent installer identified by the URL link from the CDN server 200 (at step 6). The platform binary service 250 then executes the deployment agent installer to install and start a deployment agent service 240 (at step 7). In some embodiments, the platform binary service 250 may include the version ID in the command line when installing the deployment agent service 240, so that the deployment agent service 240 knows which version of the OS application software it is supposed to download and install. In other embodiments, platform binary service 250 may store the version ID within the system registry, so that the deployment agent service 240 can access and read the version ID.

Like the registration web service/server 205, the deployment agent service 240 contains a mapping of the version ID received from the platform binary service 250 to specified location(s) within the CDN server 200 (e.g., URL links) where copies of OS application(s) corresponding to the version ID are stored. The deployment agent service 240 uses the URL link(s) corresponding to the version ID to access the CDN server 200 (at step 8) and download (at step 9) one or more OS applications (e.g., OS applications 1, 2 . . . N), which are stored within the specified location(s) of the CDN server 200, to the IHS 100. After retrieving the OS application(s) from the CDN server 200, the deployment agent service 240 stores the OS application(s) within computer readable storage device 170 to restore the OS application(s) after a change has been made to the operating system.

Figure 5:
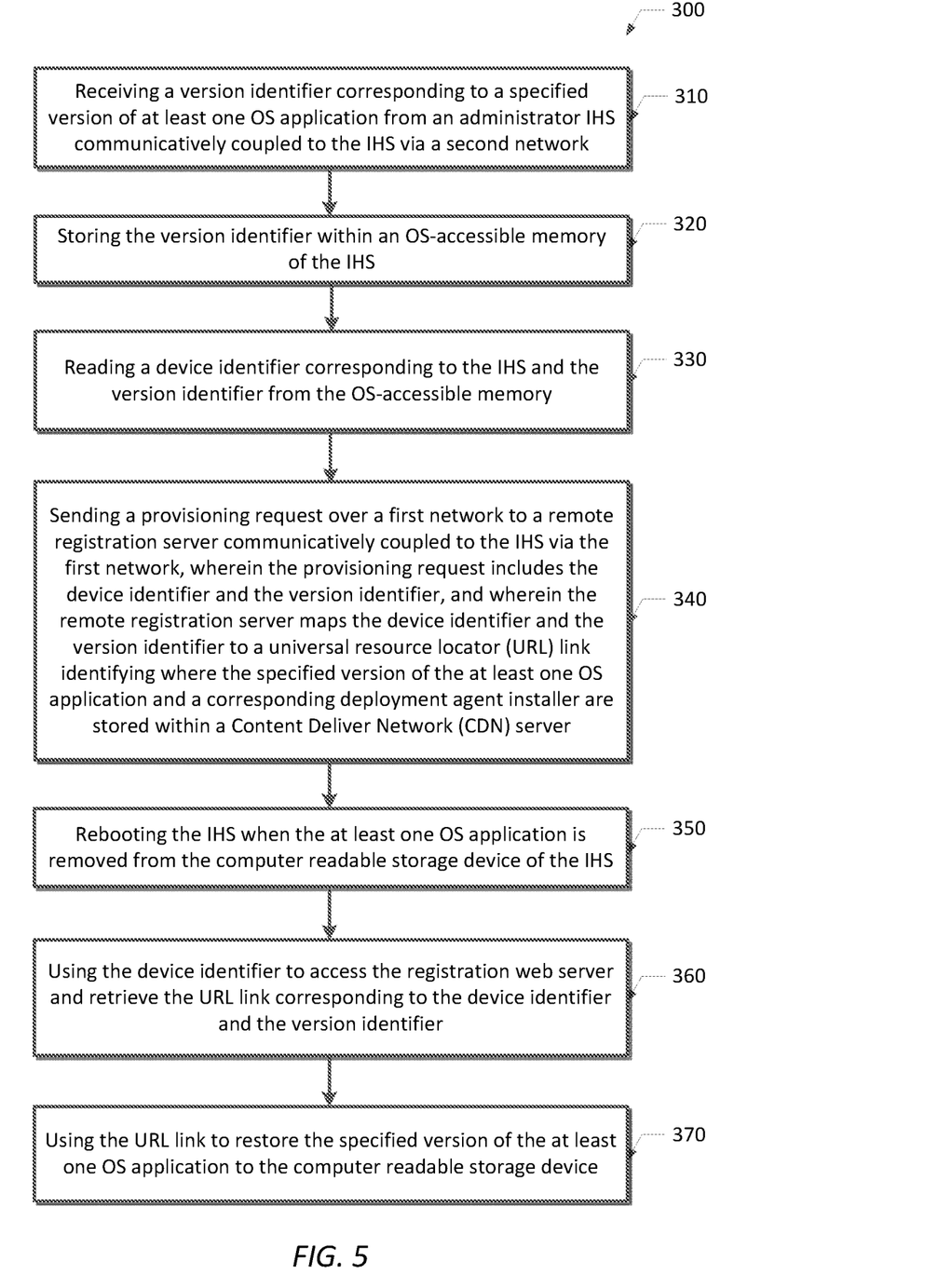
FIG. 5 is a flowchart diagram illustrating one embodiment of a method that may be performed by an information handling system (IHS) to automatically restore at least one operating system (OS) application to an information handling systems (IHS) when the at least one OS application is removed from a computer readable storage device of the IHS.

FIG. 5 is a flow chart diagram illustrating one embodiment of a method 300 that uses the techniques described herein to automatically restore at least one operating system (OS) application to an information handling system (IHS) when the at least one OS application is removed from a computer readable storage device of the IHS. The method 300 shown in FIG. 5 may generally be performed by an IHS, such as the IHS 100 shown in FIG. 2 and discussed above. As such, method 300 is a computer implemented method performed, at least in part, via execution of program instructions stored within IHS 100 (e.g., program instructions contained within one or more of the boot firmware 162, ACPI firmware 164, deployment agent installer 220, deployment agent service 240 and platform binary service 250).

Unlike the conventional approach shown in FIG. 1, the computer implemented method 300 shown in FIG. 5 improves the way in which an information handling system functions, in one respect, by controlling which version of the at least one OS application is restored to the IHS when the at least one OS application is removed from the computer readable storage device of the IHS. Like the embodiments shown in FIGS. 2-4 and described above, the computer implemented method uses a version identifier (or "version ID") to specify which version of the OS application software should be restored to the IHS. By providing a device identifier (or "device ID") corresponding to the IHS and the version ID corresponding to a specified version of the at least one OS application to a registration web server, a mapping (or map record) is created to map the device identifier and the version identifier to a universal resource locator (URL) link identifying where the specified version of the at least one OS application and corresponding deployment agent installer are stored within a Content Deliver Network (CDN) server. The computer implemented method 300 uses this mapping to control the version of the at least one OS application restored to the IHS when the at least one OS application is removed from the computer readable storage device of the IHS.

In some embodiments, the method 300 shown in FIG. 5 may include reading a device identifier and a version identifier from an OS-accessible memory of the IHS (in step 330) and sending a provisioning request including the device identifier and the version identifier over a first network to a remote registration server communicatively coupled to the IHS via the network (in step 340). As noted above, the remote registration server may be configured to: map the device identifier and the version identifier to a universal resource locator (URL) link identifying where the specified version of the at least one OS application and corresponding deployment agent installer are stored within a Content Deliver Network (CDN) server; and store the device identifier, the version identifier and the URL link within a map record.

As shown in FIG. 5, the method 300 may further include rebooting the IHS when the at least one OS application is removed from the computer readable storage device of the IHS (in step 350); using the device identifier to access the registration web server and retrieve the URL link corresponding to the device identifier and the version identifier (in step 360); and using the URL link to restore the specified version of the at least one OS application to the computer readable storage device (in step 370).

In some embodiments, using the device identifier to access the registration web server and retrieve the URL link (in step 360) may include: reading the device identifier from the OS-accessible memory; sending a discovery request over the first network to the remote registration server, wherein the discovery request includes the device identifier read from the OS-accessible memory; and receiving the URL link from the remote registration server via the first network.

In some embodiments, using the URL link to restore the specified version of the at least one OS application to the computer readable storage device (in step 370) may include: using the URL link retrieved from the registration web server to access the CDN server and retrieve the deployment agent installer corresponding to the specified version of the at least one OS application; receiving the deployment agent installer from the CDN server via the network; executing the deployment agent installer to install and start the deployment agent service, which uses a URL link previously provided to the deployment agent service to access the registration web server and retrieve the specified version of the at least one OS application from the CDN server; receiving the specified version of the at least one OS application from the CDN server via the network; and storing the specified version of the at least one OS application received from the CDN server within the computer readable storage device.

In some embodiments, the method 300 shown in FIG. 5 may perform one or more steps prior to reading the device identifier and the version identifier from the OS-accessible memory (in step 330). For example, method 300 may include: receiving the version identifier corresponding to the specified version of the at least one OS application from an administrator IHS communicatively coupled to the IHS via a second network (in step 310); and storing the version identifier within the OS-accessible memory (in step 320).

In some embodiments, the specified version of the at least one OS application may correspond to a version of the at least one OS application, which is selected by an information technology (IT) administrator to control the version of the at least one OS application restored to the IHS. For example, the IT administrator select a specific software version as the upgrade target for the at least one OS application, and may provide a version ID corresponding to the selected version of the at least one OS application to the IHS.

In other embodiments, the specified version of the at least one OS application may correspond to a version of the at least one OS application, which is selected by a software developer to control the version of the at least one OS application restored to the IHS. For example, the software developer may select between development, QA validation, prerelease and release versions of the at least one OS application, and may provide a version ID corresponding to the selected version of the at least one OS application to the IHS.

It will be understood that one or more of the tasks, functions, or methodologies described herein may be implemented, for example, as firmware or as a computer program of instructions embodied in a non-transitory tangible computer readable medium that is executed by a CPU, embedded controller, microcontroller, processor, microprocessor, FPGA, ASIC, or other suitable processing device.

While the present disclosure may be adaptable to various modifications and alternative forms, specific embodiments have been shown by way of example and described herein. However, it should be understood that the present disclosure is not intended to be limited to the particular forms disclosed. Rather, the present disclosure is to cover all modifications, equivalents, and alternatives falling within the spirit and scope of the present disclosure as defined by the appended claims. Moreover, the different aspects of the disclosed systems and methods may be utilized in various combinations and/or independently. Thus, the present disclosure is not limited to only those combinations shown herein, but rather may include other combinations.

What is claimed is:

1. A system, comprising:
an information handling system (IHS); and
a first remote system and a second remote system communicatively coupled to the IHS over a network;
wherein the IHS includes:
at least one computer readable non-volatile memory configured to store boot firmware and Advanced Configuration and Power Interface (ACPI) firmware;
a computer readable storage device configured to store an operating system (OS) for the IHS, at least one OS application, a device identifier corresponding to the IHS, and a version identifier corresponding to a specified version of the at least one OS application; and
at least one processing device, wherein when the at least one OS application is removed from the computer readable storage device, the at least one processing device executes program instructions within the boot firmware and the ACPI firmware to:
retrieve a universal resource locator (URL) link corresponding to the device identifier and the version identifier from the second remote system, wherein the URL link identifies where the specified version of the at least one OS application and a corresponding deployment agent installer are stored within the first remote system; and
use the URL link to automatically restore the specified version of the at least one OS application to the computer readable storage device.

2. A system, comprising:
an information handling system (IHS), comprising:
at least one computer readable non-volatile memory configured to store boot firmware and Advanced Configuration and Power Interface (ACPI) firmware;
a computer readable storage device configured to store an operating system (OS) for the IHS, at least one OS application, a device identifier corresponding to the IHS, and a version identifier corresponding to a specified version of the at least one OS application; and
at least one processing device configured to execute program instructions within the boot firmware and the ACPI firmware to automatically restore the specified version of the at least one OS application to the computer readable storage device if the at least one OS application is removed from the computer readable storage device; and
a plurality of remote systems communicatively coupled to the IHS via a network, wherein the plurality of remote systems comprise:
a first remote system configured to store:
multiple versions of the at least one OS application; and
a deployment agent installer for each version of the at least one OS application stored within the first remote system;
wherein each version of the at least one OS application and corresponding deployment agent installer are stored within the first remote system at a location identified by a universal resource locator (URL) link; and
a second remote system configured to map the device identifier and the version identifier to a URL link identifying where the specified version of the at least one OS application and corresponding deployment agent installer are stored within the first remote system.

3. The system as recited in claim 2, wherein the first remote system is a Content Deliver Network (CDN) server and the second remote system is a registration web server.

4. The system as recited in claim 2, wherein the second remote system is configured to save the device identifier, the version identifier and the URL link within a map record stored within the second remote system.

5. The system as recited in claim 2, wherein a deployment agent installer is provided to the IHS before the at least one OS application is removed from the computer readable storage device, and wherein the version identifier corresponding to the specified version of the at least one OS application is attached to the deployment agent installer to specify which version of the at least one OS application to restore.

6. The system as recited in claim 5, wherein the at least one processing device is configured to execute program instructions within the deployment agent installer to:
   store the version identifier attached to the deployment agent installer within an OS-accessible memory of the IHS, the device identifier is also stored within the OS-accessible memory;
   store a deployment agent service within the computer readable storage device; and
   extract a platform binary service from the boot firmware and store the platform binary service within the computer readable storage device.

7. The system as recited in claim 6, wherein the at least one processing device is configured to execute program instructions within the platform binary service to:
   read the version identifier and the device identifier from the OS-accessible memory; and
   send a provisioning request to the second remote system via the network, wherein the provisioning request includes the device identifier and the version identifier read from the OS-accessible memory.

8. The system as recited in claim 7, wherein the second remote system is configured to:
   save the device identifier, the version identifier and the URL link within a map record stored within the second remote system upon receiving the provisioning request; and
   send the URL link to the platform binary service via the network.

9. The system as recited in claim 8, wherein the at least one processing device is configured to execute program instructions within the platform binary service to:
   enable a Windows Platform Binary Table (WPBT) in the boot firmware, wherein the WPBT includes a platform binary, which is executed after the at least one OS application is removed from the computer readable storage device when the IHS is rebooted to install the platform binary service.

10. The system as recited in claim 9, wherein after the at least one OS application is removed from the computer readable storage device and the IHS is rebooted, the at least processing device is configured to execute program instructions within the operating system to:
   read the WPBT and load the platform binary included within the WPBT into system memory;
   execute the platform binary loaded into system memory to install the platform binary service; and
   execute the platform binary service to access the second remote system and retrieve the URL link that identifies where the specified version of the at least one OS application and the corresponding deployment agent installer are stored within the first remote system.

11. The system as recited in claim 10, wherein the at least one processing device is configured to execute program instructions within the platform binary service to:
   read the device identifier from the OS-accessible memory; and
   send a discovery request to the second remote system via the network, wherein the discovery request includes the device identifier read from the OS-accessible memory.

12. The system as recited in claim 11, wherein the second remote system is configured to:
   use the device identifier included within the discovery request to obtain the map record corresponding to the device identifier;
   retrieve the URL link corresponding to the version identifier from the map record; and
   send the URL link to the platform binary service via the network.

13. The system as recited in claim 12, wherein the at least one processing device is configured to execute program instructions within the platform binary service to:
   download the deployment agent installer identified by the URL link from the first remote system; and
   execute the deployment agent installer to install and start the deployment agent service.

14. The system as recited in claim 13, wherein the at least one processing device is configured to execute program instructions within the deployment agent service to:
   use a URL link previously provided to the deployment agent service to access the first remote system and retrieve the specified version of the at least one OS application; and
   store the specified version of the at least one OS application retrieved from the first remote system within the computer readable storage device.

15. A computer implemented method performed by an information handling system (IHS) to automatically restore at least one operating system (OS) application to the IHS when the at least one OS application is removed from a computer readable storage device of the IHS, the computer implemented method comprising:
   reading a device identifier and a version identifier from an OS-accessible memory of the IHS, wherein the device identifier corresponds to the IHS and the version identifier corresponds to a specified version of the at least one OS application;
   sending a provisioning request over a first network to a remote registration server communicatively coupled to the IHS via the first network, wherein the provisioning request includes the device identifier and the version identifier, and wherein the remote registration server maps the device identifier and the version identifier to a universal resource locator (URL) link identifying where the specified version of the at least one OS application and a corresponding deployment agent installer are stored within a Content Deliver Network (CDN) server;
   rebooting the IHS when the at least one OS application is removed from the computer readable storage device of the IHS;
   using the device identifier to access the remote registration server and retrieve the URL link corresponding to the device identifier and the version identifier; and
   using the URL link to restore the specified version of the at least one OS application to the computer readable storage device.

16. The computer implemented method as recited in claim 15, wherein said using the device identifier to access the remote registration server and retrieve the URL link comprises:
   reading the device identifier from the OS-accessible memory;

sending a discovery request over the first network to the remote registration server, wherein the discovery request includes the device identifier read from the OS-accessible memory; and receiving the URL link from the remote registration server via the first network.

17. The computer implemented method as recited in claim 15, wherein said using the URL link to restore the specified version of the at least one OS application to the computer readable storage device comprises:

using the URL link retrieved from the remote registration server to access the CDN server and retrieve the deployment agent installer corresponding to the specified version of the at least one OS application;

receiving the deployment agent installer from the CDN server via the first network;

executing the deployment agent installer to install and start the deployment agent service, which uses a URL link previously provided to the deployment agent service to access the remote registration server and retrieve the specified version of the at least one OS application from the CDN server;

receiving the specified version of the at least one OS application from the CDN server via the first network; and storing the specified version of the at least one OS application received from the CDN server within the computer readable storage device.

18. The computer implemented method as recited in claim 15, wherein prior to said reading a device identifier and a version identifier from an OS-accessible memory of the IHS, the computer implemented method further comprises:

receiving the version identifier corresponding to the specified version of the at least one OS application from an administrator IHS communicatively coupled to the IHS via a second network; and storing the version identifier within the OS-accessible memory.

19. The computer implemented method as recited in claim 18, wherein the specified version of the at least one OS application corresponds to a version of the at least one OS application, which is selected by an information technology (IT) administrator to control the version of the at least one OS application restored to the IHS.

20. The computer implemented method as recited in claim 18, wherein the specified version of the at least one OS application corresponds to a version of the at least one OS application, which is selected by a software developer to control the version of the at least one OS application restored to the IHS.

* * * * *